United States Patent
DiBenedetto

(10) Patent No.: US 10,487,751 B2
(45) Date of Patent: Nov. 26, 2019

(54) SWITCHING BLEED VALVE FOR A GAS TURBINE ENGINE

(71) Applicant: United Technologies Corporation, Farmington, CT (US)

(72) Inventor: Enzo DiBenedetto, Berlin, CT (US)

(73) Assignee: United Technologies Corporation, Farmington, CT (US)

( * ) Notice: Subject to any disclaimer, the term of this patent is extended or adjusted under 35 U.S.C. 154(b) by 136 days.

(21) Appl. No.: 15/722,000

(22) Filed: Oct. 2, 2017

(65) Prior Publication Data

US 2019/0101061 A1  Apr. 4, 2019

(51) Int. Cl.

| | | |
|---|---|---|
| *F02C 9/18* | (2006.01) | |
| *F02C 6/08* | (2006.01) | |
| *F02K 3/075* | (2006.01) | |
| *F04D 27/02* | (2006.01) | |
| *F01D 17/10* | (2006.01) | |
| *F04D 29/52* | (2006.01) | |
| *F04D 29/54* | (2006.01) | |

(52) U.S. Cl.
CPC .............. *F02C 9/18* (2013.01); *F01D 17/105* (2013.01); *F02C 6/08* (2013.01); *F02K 3/075* (2013.01); *F04D 27/023* (2013.01); *F04D 27/0215* (2013.01); *F04D 29/522* (2013.01); *F04D 29/542* (2013.01); *F05D 2240/581* (2013.01); *F05D 2260/57* (2013.01); *F05D 2270/101* (2013.01)

(58) Field of Classification Search
CPC .. F04D 27/0215; F04D 27/023; F01D 17/105; F02C 6/08; F02C 9/18
See application file for complete search history.

(56) References Cited

U.S. PATENT DOCUMENTS 2,863,288 A * 12/1958 Martin ..................... F02C 6/08
                                                              415/145
5,694,767 A    12/1997 Vdoviak et al.
(Continued)

FOREIGN PATENT DOCUMENTS

WO       2015030907        3/2015

OTHER PUBLICATIONS

European Search Report for Application No. 1819299.2 dated Feb. 2, 2019.

*Primary Examiner* — Carlos A Rivera
*Assistant Examiner* — Behnoush Haghighian
(74) *Attorney, Agent, or Firm* — Carlson, Gaskey & Olds, P.C.

(57) ABSTRACT

A gas turbine engine includes a compressor section having multiple stages, a combustor section fluidly connected to the compressor section, a turbine section fluidly connected to the combustor section, and a bleed structure radially outward of the stages. The bleed structure includes a body structure having a first set of openings radially outward of a first stage and a second set of openings radially outward of a second stage. The bleed structure further includes a circumferential sleeve configured to cover the first set of openings in a first position and configured to cover the second set of openings in a second position. An actuator is coupled to the circumferential sleeve and is configured to articulate the sleeve between the first and second positions.

14 Claims, 5 Drawing Sheets

(56) References Cited

U.S. PATENT DOCUMENTS

| | | | |
|---|---|---|---|
| 8,429,892 B2 * | 4/2013 | Tentorio | F02C 7/232 |
| | | | 137/112 |
| 8,696,299 B2 | 4/2014 | Bywater et al. | |
| 9,657,647 B2 | 5/2017 | Mackin et al. | |
| 10,174,681 B2 * | 1/2019 | Beecroft | F01D 17/105 |
| 2015/0104289 A1 * | 4/2015 | Mackin | F04D 27/023 |
| | | | 415/1 |
| 2016/0123237 A1 * | 5/2016 | Spagnoletti | F02C 7/14 |
| | | | 60/776 |
| 2016/0265442 A1 | 9/2016 | Beecroft | |
| 2016/0348685 A1 | 12/2016 | Urac et al. | |
| 2017/0082196 A1 * | 3/2017 | Coleman | F16J 9/14 |
| 2017/0218853 A1 * | 8/2017 | Mackin | F04D 27/023 |
| 2017/0276148 A1 * | 9/2017 | Suciu | F04D 29/542 |

\* cited by examiner

SWITCHING BLEED VALVE FOR A GAS TURBINE ENGINE

STATEMENT REGARDING FEDERALLY SPONSORED RESEARCH OR DEVELOPMENT

This invention was made with government support under contract number FA8650-15-D-2502/0002 awarded by the United States Air Force. The government has certain rights in the invention.

TECHNICAL FIELD

The present disclosure relates generally to compressor bleed systems for gas turbine engines, and more specifically to a switching bleed valve for a gas turbine engine compressor bleed.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine.

As gas turbine engine architectures have achieved higher efficiencies, corresponding increases in turbine and combustor temperatures have occurred. As a result, the need for modulation of cooling air from upstream sources, such as from the compressor section, has similarly increased. Existing engine architectures use multiple cooling bleeds within the compressor to provide varied temperature cooling air from the compressor section to systems in need of cooling. Switching between cooling bleed stages in such a system is achieved using external plumbing and valves within the engine housing remote from the physical bleed locations. This configuration results in a large size and weight for the modulation system.

SUMMARY OF THE INVENTION

In one exemplary embodiment a gas turbine engine includes a compressor section including a plurality of stages, a combustor section fluidly connected to the compressor section, a turbine section fluidly connected to the combustor section, a bleed structure radially outward of the plurality of stages, the bleed structure including a body structure having a first set of openings radially outward of a first stage and a second set of openings radially outward of a second stage, the bleed structure further including a circumferential sleeve configured to cover the first set of openings in a first position and configured to cover the second set of openings in a second position, and an actuator coupled to the circumferential sleeve, the actuator being configured to articulate the sleeve between the first and second positions.

In another example of the above described gas turbine engine the second set of openings connects to an aft most stage of the compressor section.

In another example of any of the above described gas turbine engines the first set of openings connects to a first stage of the compressor and wherein the second set of openings connects to a second stage for the compressor, and wherein the first stage and the second stage are separated by at least one intermediate stage of the compressor.

In another example of any of the above described gas turbine engines the actuator is a rack and pinion actuator, and wherein an activation arm of the actuator is interfaced with the sleeve via a toothed section.

Another example of any of the above described gas turbine engines the sleeve further includes at least one slot and the body structure includes a post protruding radially outward into the slot.

In another example of any of the above described gas turbine engines the slot is angled relative to an actuation arm of the actuator.

In another example of any of the above described gas turbine engines the circumferential sleeve covers at least 80% of one of the first set of openings and the second set of openings during an entirety of a transition from the first position to the second position.

Another example of any of the above described gas turbine engines further includes a seal disposed between the circumferential sleeve and the body structure.

In another example of any of the above described gas turbine engines the seal is a piston seal.

In another example of any of the above described gas turbine engines further includes a single bleed plenum disposed immediately radially outward of the bleed structure and fluidly connected to the first set of openings while the circumferential sleeve is in the second position, and fluidly connected to the second set of openings while the circumferential sleeve is in the first position.

In another example of any of the above described gas turbine engines further includes a ducting system connecting the plenum to a cooling air system.

In one exemplary embodiment a switching bleed valve for a gas turbine engine includes a body structure having a first set of openings disposed circumferentially about a first edge and a second set of openings circumferentially disposed about a second edge, the body being ring shaped and defining an axis, a circumferential sleeve radially outward of the body structure and configured to cover the first set of openings in a first position and configured to cover the second set of openings in a second position, and an actuator coupled to the circumferential sleeve, the actuator being configured to articulate the sleeve between the first and second positions.

In another example of the above described bleed valve for a gas turbine engine the actuator includes an actuator arm interfaced with the circumferential sleeve via a toothed structure.

In another example of any of the above described bleed valves for a gas turbine engine the circumferential sleeve includes at least one slot, the body structure includes at least one corresponding post, and wherein the post is received in the slot.

In another example of any of the above described bleed valves for a gas turbine engine the slot is angled relative to an actuation direction of the actuator such that circumferential actuation of the circumferential sleeve is translated into axial motion of the circumferential sleeve.

In another example of any of the above described bleed valves for a gas turbine engine a contact between the circumferential sleeve and the body structure is sealed via at least one piston seal.

In another example of any of the above described bleed valves for a gas turbine engine the contact is sealed via multiple piston seals.

An exemplary method for adjusting a temperature and pressure of bleed air in a gas turbine engine includes shifting a circumferential sleeve of a switching bleed valve axially, and thereby covering a first set of bleed openings connected to a first stage of a compressor and uncovering a second set of bleed openings connected to a second stage of a compressor.

In another example of the above described exemplary method for adjusting a temperature and pressure of bleed air in a gas turbine engine shifting the circumferential sleeve includes providing a circumferential actuation via a rack and pinion actuator, and translating the circumferential actuation to an axial motion using at least one follower received in a track of the circumferential sleeve.

These and other features of the present invention can be best understood from the following specification and drawings, the following of which is a brief description.

DETAILED DESCRIPTION OF AN EMBODIMENT

Figure 1:
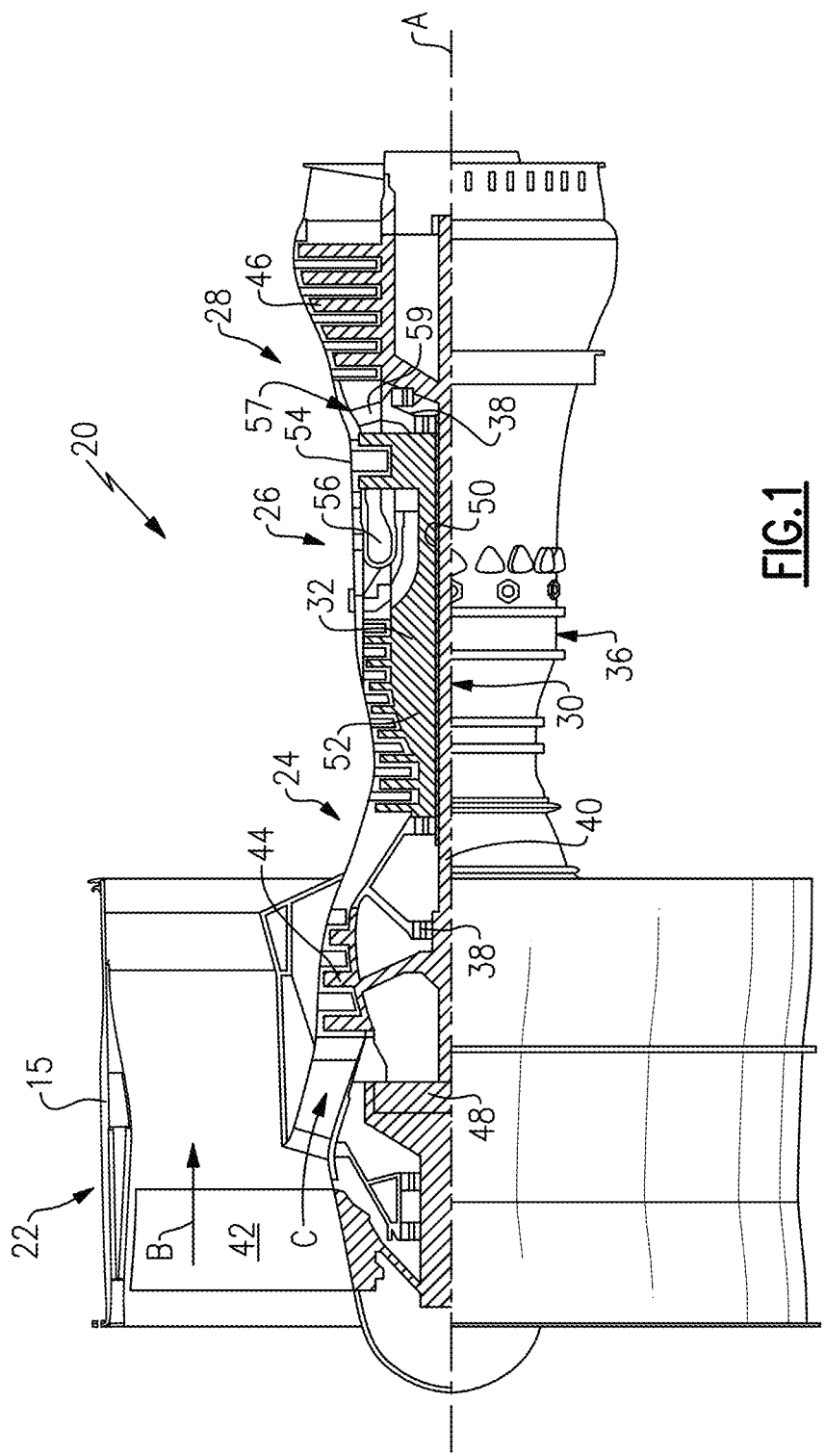
FIG. 1 illustrates an exemplary gas turbine engine according to an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

In order to provide cooling air to high temperature areas of the gas turbine engine 20, relatively cool air is provided from the compressor section 24 via multiple compressor bleeds and a cooling air system. During different operating modes of the gas turbine engine 20, such as cruise vs. takeoff, different temperatures and pressures of the cooling air are required at the cooled engine systems. In order to provide the correct temperature and pressure of cooling air, a switching bleed valve is configured to switch a single bleed between at least a first bleed position at a first stage of the compressor section and a second bleed position at a second stage of the compressor section.

Figure 2:
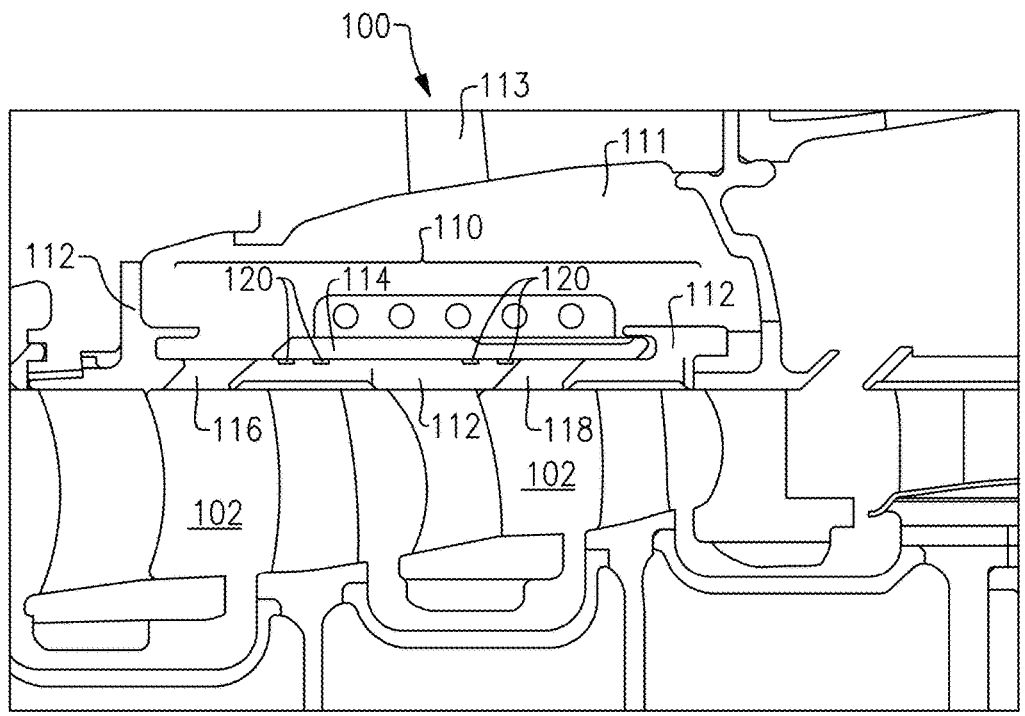
FIG. 2 schematically illustrates a side view of an exemplary compressor section of a gas turbine engine including a switching bleed valve in a first position.
Figure 3:
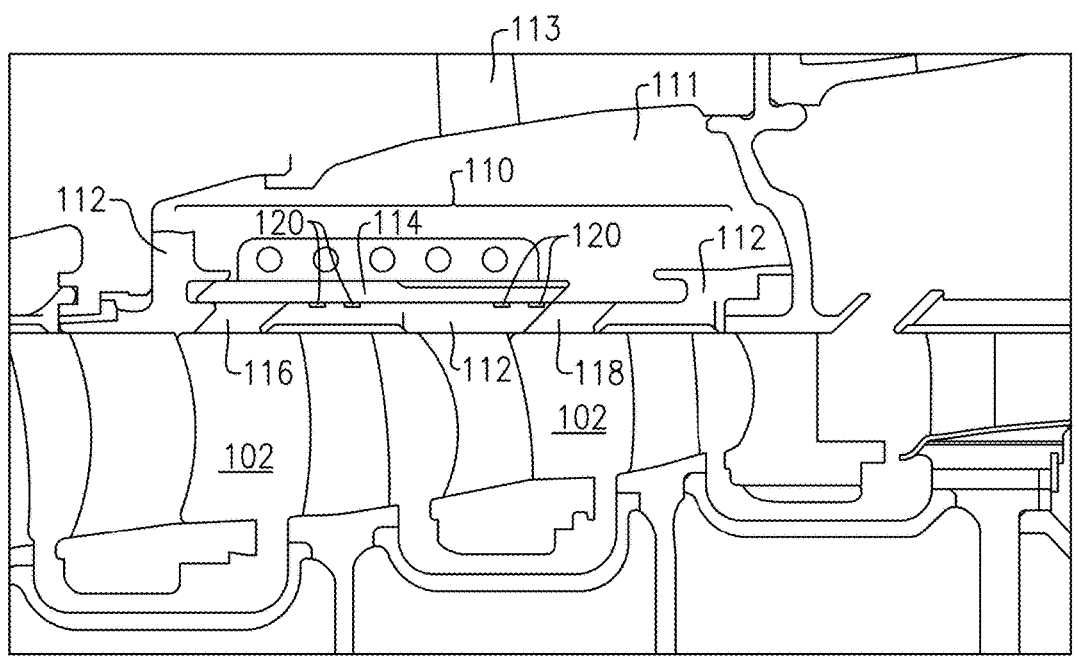
FIG. 3 schematically illustrates a side view of the exemplary compressor section of FIG. 2 including a switching bleed valve in a second position.

With continued reference to FIG. 1, FIG. 2 schematically illustrates a side view of an exemplary compressor section 100 including a switching bleed valve 110 in a first position. FIG. 3 schematically illustrates a side view of the exemplary compressor section 100 including the switching bleed valve 110 in a second position. The switching bleed valve 110 includes a body structure 112 and a circumferential sleeve 114. The body structure 112 includes a first set of openings 116 connecting to the primary flowpath 102 at a first stage of the illustrated compressor section 100. The body structure 112 also includes a second set of openings 118 downstream of the first set of openings 116. The second set of openings 118 connect to the primary flowpath 102 at a second stage of the compressor section 100. In some examples, the first and second stages are separated by at least one intermediate stage of the compressor section 100. In alternative examples, the first and second stages can be adjacent to each other. In the illustrated example, the second set of openings 118 connect to the primary flowpath 102 at the aft most stage of the compressor section 100. In further alternative examples, alternate stages can be utilized, depending on the cooling air temperature and pressure needs of the given engine.

When uncovered, a given set of openings 116, 118 bleeds air from the corresponding compressor stage to a plenum 111 radially outward of the switching bleed valve 110. Air in the plenum 111 is provided through a pipe 113, or other ducting system, to a cooling air system elsewhere in the gas turbine engine. By utilizing the switching bleed valve 110, the number and size of the control valves needed to control the cooling air is reduced, relative to system utilizing individual bleeds.

The circumferential sleeve 114 is in contact with the body structure 112, and is sealed via a plurality of piston seals 120. In alternative examples, other suitable seal type could be utilized to the same effect. The seals 120 operate to prevent a flowpath from being created that connects the covered set of openings 116, 118 to the uncovered set of openings 116, 118, thereby preventing bleed air having an undesirable pressure and/or temperature from escaping at any given time.

During operation of the gas turbine engine, the circumferential sleeve 114 is slid axially, along the axis defined by the engine core to switch between the sets of openings 116, 118. While the circumferential sleeve 114 is in a first position (illustrated in FIG. 2), the circumferential sleeve 114 covers the second set of openings 118. In this position, the switching bleed valve 110 provides air at a temperature and pressure of the compressor stage connected to the first set of openings 116. The volume of air provided can be controlled via any known modulation technique. When engine operating conditions require a higher temperature and/or pressure, the circumferential sleeve 114 is slid axially forward, along the axis of the engine core, into a second position (illustrated in FIG. 3). While in the second position, the first set of openings 116 are covered, and the second set of openings 118 are uncovered. In the second position, the cooling air provided to the plenum 111 is at the temperature and pressure corresponding to the temperature and pressure of the compressor flowpath at the second set of openings 118.

In some examples, such as the illustrated example of FIGS. 2 and 3, due to the length of the circumferential cover, and the specific configuration of the switching bleed valve 110, while shifting from the first position to the second position, each opening in the second set of openings 118 remains at least 80% covered when the first set of openings becomes 80% covered. Similarly when sliding from the second position to the first position, each opening in the first set of openings 116 remains at least 80% when the second set of openings becomes 80% covered. With continued reference to FIGS. 2 and 3, FIG. 4 schematically illustrates the switching bleed valve 110 in an intermediate position between the first and second positions, as the switching bleed valve 110 transitions from the first position to the second position (or vice-versa).

In yet further examples, it is contemplated that the switching bleed valve 110 can be designed to be maintained at one or more intermediate positions between the first and second position, thereby providing a mixed flow from both the first set of openings 116 and the second set of openings 118.

Figure 4:
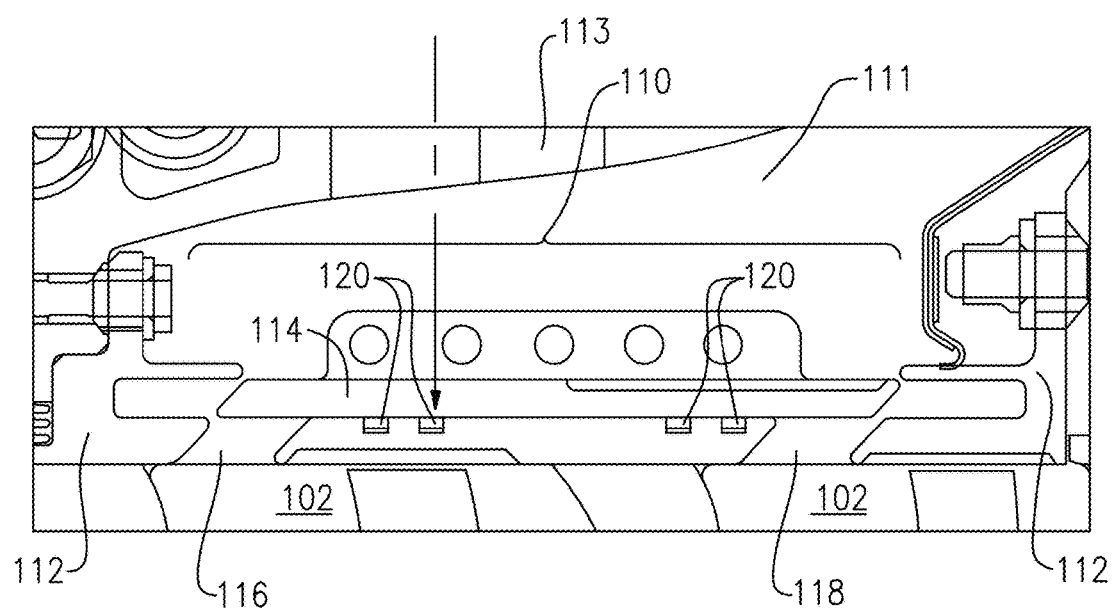
FIG. 4 schematically illustrates a side view of the exemplary compressor section of FIG. 2 including a switching bleed valve in an intermediate position between the first and second position.
Figure 5:
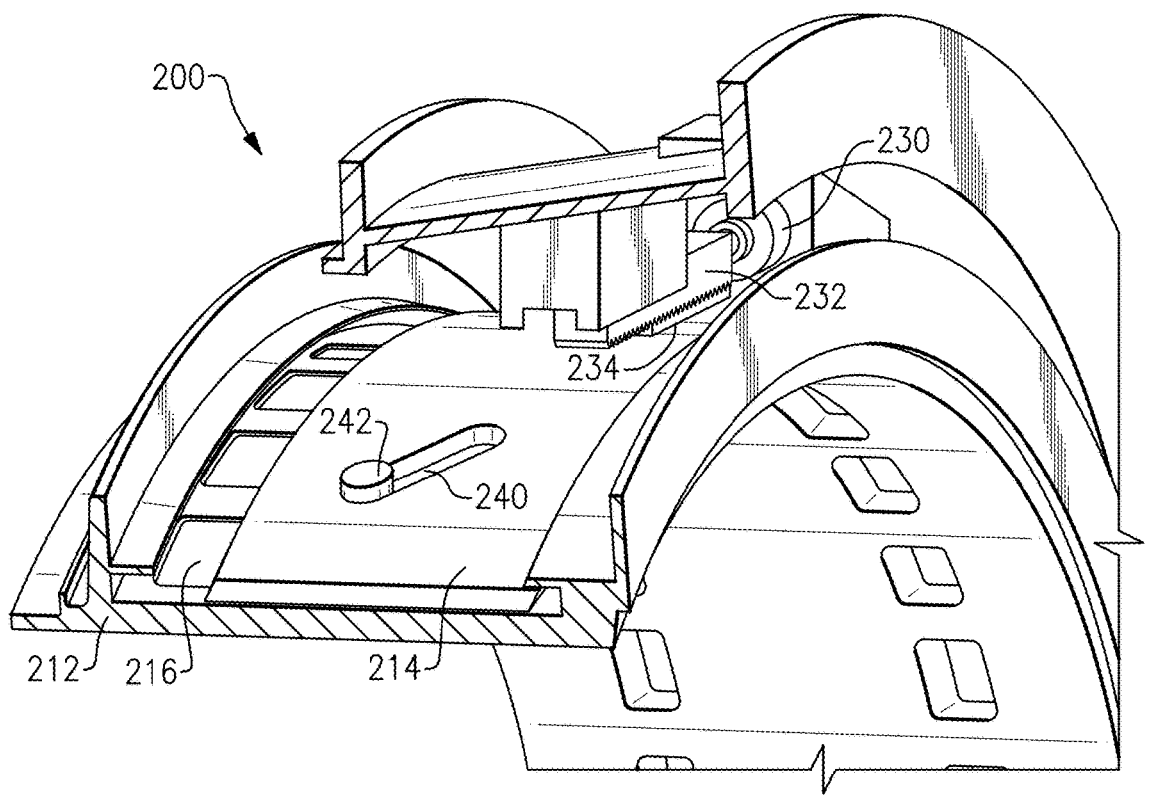
FIG. 5 schematically illustrates an isometric view of an exemplary compressor bleed valve structure in a first position.

The axial translation of the circumferential sleeve 114 along the body structure 112 is achieved via a connection to a rack and pinion actuator and a set of posts and slots configured to convert the circumferential rotation of the circumferential sleeve 114 into axial translation of the circumferential sleeve 114, as illustrated in FIGS. 4 and 5. The rack and pinion actuator is controlled via an engine controller according to known actuator control techniques. In some examples the engine controller is a dedicated bleed valve controller. In alternative examples the controller is a general engine controller and controls multiple functions of the gas turbine engine including the compressor section 100.

Figure 6:
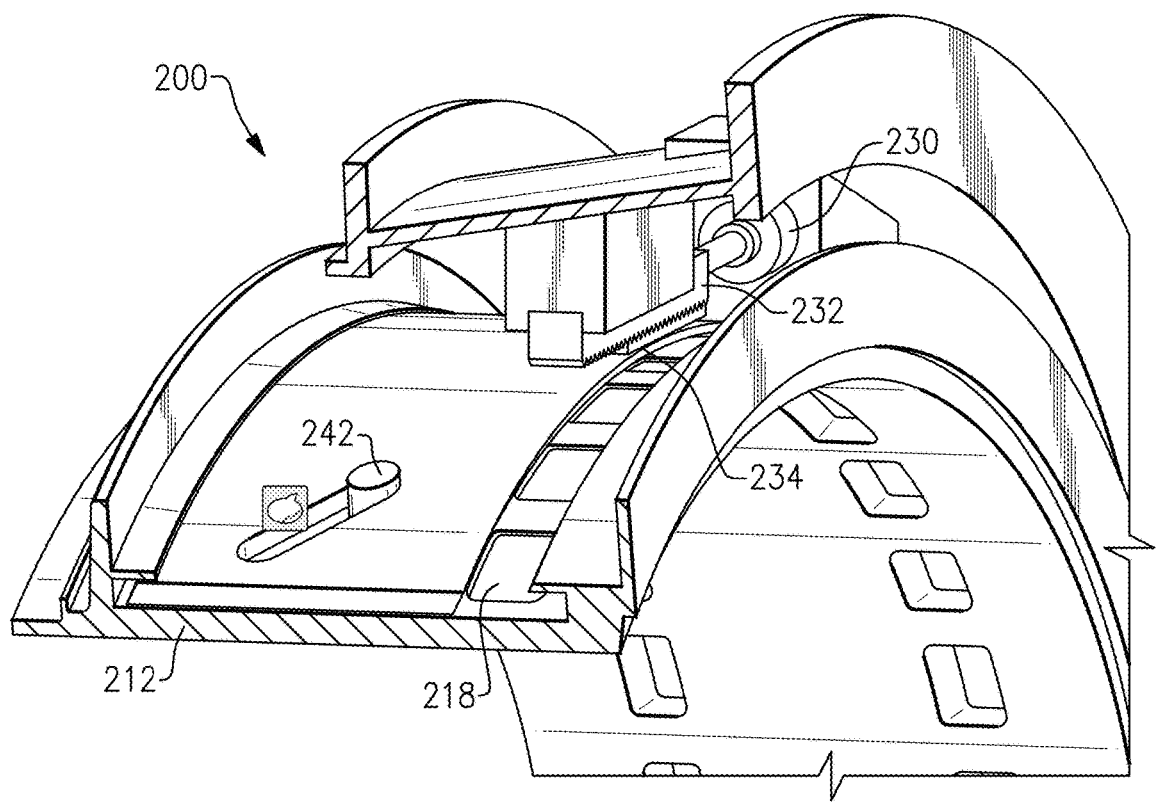
FIG. 6 schematically illustrates the isometric view of the exemplary compressor bleed valve structure of FIG. 5 in a second position.

With continued reference to FIGS. 2-4, FIG. 5 schematically illustrates an isometric view of an exemplary compressor bleed valve structure 200 in a first position. FIG. 6 schematically illustrates an isometric view of the exemplary bleed valve structure 200 of FIG. 5 in a second position. As with the example of FIGS. 2-4, the bleed valve structure 200 includes a body structure 212 and a circumferential sleeve 214. The body structure 212 includes a first set of openings 216 connecting to the primary flowpath at a first stage of the compressor section. The body structure 212 also includes a second set of openings 218 downstream of the first set of openings 216. The second set of openings 218 connects to the primary flowpath at a second stage of the compressor section.

Each set of openings 116, 118 includes multiple uniform openings disposed circumferentially about the ring shaped body structure 212 of the bleed valve 200, with all of the openings in any one set being at the same axial position, relative to an axis of the gas turbine engine including the structure. Each of the openings 116, 118 is angled to include a directional component aligned with the direction of flow through the primary flowpath. The angled opening reduces turning required by the bleed air at the bleed, thereby increasing the efficiency of the bleed.

An actuator 230 is disposed radially outward of the circumferential sleeve 214. The actuator 230 includes an actuation arm 232 interfaced with the circumferential sleeve 214 via a toothed interface 234. Extension or retraction of the actuator arm 232 induces rotation of the circumferential sleeve 214 about the axis defined by the circumferential sleeve 214.

Included in the circumferential sleeve 214 are one or more slots 240. The slots 240 receive a post 242 protruding radially outward from the body structure 212. The slots 240 are angled, relative to a direction of actuation of the actuator arm 234. As a result of the angle, and the received post 242, the slots 240 convert the circumferential motion from the actuator 230 into an axial motion, allowing the actuator arm 232 to transition the circumferential sleeve 214 from the first position (FIG. 5) to the second position (FIG. 6). The posts 242 can be alternatively referred to as followers, and the slots 240 receiving the posts 242 can be alternatively referred to as tracks.

With reference now to the examples of FIGS. 2-5, in some instances it can be desirable to mix the air from both sets of openings 116, 118, 216, 218 to provide a specified temperature and pressure air from the switching bleed valve 110, 200. In such examples, the controller controlling the actuator 230 can determine an intermediate position, where a percentage of both sets of openings 116, 118, 216, 218 is uncovered. By controlling the percentage of each opening in the sets of openings 116, 118, 216, 218 that is uncovered a more precise cooing air mixture can be provided, with the cooling air mixture having a pressure and temperature that is between the pressure and temperature at the stages corresponding to each of the sets of openings 116, 118, 216, 218.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor section including a plurality of stages;
a combustor section fluidly connected to the compressor section;
a turbine section fluidly connected to the combustor section;
a bleed structure radially outward of the plurality of stages, the bleed structure including a body structure having a first set of openings radially outward of a first stage and a second set of openings radially outward of a second stage, the bleed structure further including a circumferential sleeve configured to cover the first set of openings in a first position and configured to cover the second set of openings in a second position, the sleeve including a slot, and wherein the body structure includes a post protruding radially into the slot, and wherein the slot is angled relative to an actuation arm of the actuator; and
an actuator coupled to the circumferential sleeve, the actuator being configured to articulate the sleeve between the first and second positions.

2. The gas turbine engine of claim 1, wherein the second set of openings connects to an aft most stage of the compressor section.

3. The gas turbine engine of claim 1, wherein the first set of openings connects to a first stage of the compressor and wherein the second set of openings connects to a second stage of the compressor, and wherein the first stage and the second stage are separated by at least one intermediate stage of the compressor.

4. The gas turbine engine of claim 1, wherein the actuator is a rack and pinion actuator, and wherein an activation arm of the actuator is interfaced with the sleeve via a toothed section.

5. The gas turbine engine of claim 1, wherein the circumferential sleeve covers at least 80% of one of said first set of openings and said second set of openings during an entirety of a transition from the first position to the second position.

6. The gas turbine engine of claim 1, further comprising a seal disposed between the circumferential sleeve and the body structure.

7. The gas turbine engine of claim 6, wherein the seal is a piston seal.

8. The gas turbine engine of claim 1, further comprising a single bleed plenum disposed immediately radially outward of the bleed structure and fluidly connected to the first set of openings while the circumferential sleeve is in the second position, and fluidly connected to the second set of openings while the circumferential sleeve is in the first position.

9. The gas turbine engine of claim 8, further comprising a ducting system connecting the plenum to a cooling air system.

10. A switching bleed valve for a gas turbine engine comprising:
a body structure having a first set of openings disposed circumferentially about a first edge and a second set of openings circumferentially disposed about a second edge, the body being ring shaped and defining an axis;
a circumferential sleeve radially outward of the body structure and configured to cover the first set of openings in a first position and configured to cover the second set of openings in a second position, the circumferential sleeve including a slot;
an actuator coupled to the circumferential sleeve, the actuator being configured to articulate the sleeve between the first and second positions; and
wherein the slot is angled relative to an actuation direction of the actuator such that circumferential actuation of the circumferential sleeve is translated into axial motion of the circumferential sleeve.

11. The switching bleed valve of claim 10, wherein the actuator includes an actuator arm interfaced with the circumferential sleeve via a toothed structure.

12. The switching bleed valve of claim 10, wherein a contact between the circumferential sleeve and the body structure is sealed via at least one piston seal.

13. The switching bleed valve of claim 12, wherein the contact is sealed via multiple piston seals.

14. A method for adjusting a temperature and pressure of bleed air in a gas turbine engine comprising:
shifting a circumferential sleeve of a switching bleed valve axially by providing a circumferential actuation via a rack and pinion actuator, and translating the circumferential actuation to an axial motion using at least one follower received in a track of the circumferential sleeve, and thereby covering a first set of bleed openings connected to a first stage of a compressor and uncovering a second set of bleed openings connected to a second stage of a compressor.

* * * * *